United States Patent [19]

Roehler, II

[11] 3,728,748

[45] Apr. 24, 1973

[54] MOORING APPARATUS

[75] Inventor: Frederick G. Roehler, II, Oxnard, Calif.

[73] Assignee: The United States of America as represented by the Secretary of the Navy

[22] Filed: Nov. 27, 1970

[21] Appl. No.: 93,318

[52] U.S. Cl. .................................................9/8 R
[51] Int. Cl. ............................................B63b 21/52
[58] Field of Search ................9/8, 8.3 E; 114/230; 174/9 F

[56] References Cited

UNITED STATES PATENTS

| 3,590,408 | 7/1971 | Verhagen | 9/8 R |
| 3,426,803 | 2/1969 | Kikukawa | 9/8 R |
| 3,093,848 | 6/1963 | Schick et al. | 9/8 R |
| 3,130,703 | 4/1964 | Thompson | 9/8 R X |
| 3,408,971 | 11/1968 | Mott | 9/8 R X |

FOREIGN PATENTS OR APPLICATIONS 1,018,196 1/1966 Great Britain.........................114/230

Primary Examiner—Richard E. Aegerter
Assistant Examiner—Douglas D. Watts
Attorney—Richard S. Sciascia, Q. Baxter Warner and Howard J. Murray, Jr.

[57] ABSTRACT

A tethering arrangement for a water-borne object which is effective to absorb forces tending to cause positional displacements thereof and subsequently utilize the energy so absorbed to return the object to its original location. In a preferred embodiment, one or more elongate members each having a predetermined elasticity factor connecting the floating object to a fixed sub-surface point or structure, the overall length of each such member varying in accordance with the stresses imposed thereon by virtue of weather conditions and/or other environmental factors to which the floating object may be subjected. In addition, the constant flexing of the elastic members greatly inhibits the growth of marine organisms on the surface thereof, as well as eliminating the cyclic stress which leads to the failure of steel components due to work-hardening.

1 Claim, 5 Drawing Figures

MOORING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The mooring of ships, buoys and other floating objects has engaged the attention of man since the earliest times. The simplest method, and one still extensively used, is merely to tie one end of a rope or cable to the object to be moored, the other end of such rope or cable being secured to an anchor or other fixed point. Although effective under ordinary circumstances, the tethering member may fail under highly adverse weather conditions, and, in any event, the moored object is usually free to drift about the fixed point to which the rope or cable is attached.

For certain purposes such wide freedom of movement of a tethered object cannot be tolerated. One example is that of a buoy serving as a weather station to monitor wind speed and direction, air temperature, sea surface temperature, and barometric pressure. This derived data is customarily transmitted from the buoy at regular intervals in the form of a coded message. These messages are received and decoded at a central point, and integrated into a network of world-wide reports which are used to analyze and forecast the weather over the geographical area of interest.

However, important meteorological and oceanographic data has been lost, and expensive buoys damaged, due to failure of the mooring apparatus to yield to high displacement forces while still remaining "on station." Furthermore, buoy stability has been a serious problem, since variations in the positional status of the buoy can result in unacceptable inaccuracies in the derived data.

SUMMARY OF THE INVENTION

The present concept makes use of one or more tethering members for a floating object, such members having a predetermined factor of elasticity and being so arranged as to impart a restoring force to compensate for both linear and angular positional displacements of the object tethered thereby. In a preferred embodiment, one or more electrical conductors are integrated into the assembly. The invention also contemplates the use of materials offering high resistance to the growth of many marine organisms on the surface thereof, as well as a similar resistance to corrosion.

STATEMENT OF THE OBJECTS OF THE INVENTION

One object of the present invention, therefore, is to provide improved means for tethering a floating object.

Another object of the invention is to provide means for stabilizing a buoy against both linear and angular positional displacements.

A further object of the invention is to provide tethering means for a floating object, such means having a predetermined degree of elasticity.

An additional object of the invention is to provide for the tethering of a floating object by means which possesses a high degree of corrosion resistance and which also offers unusual resistance to the growth of marine organisms on the surface thereof.

Other objects, advantages and novel features of the invention will become apparent from the following detailed description of the invention when considered in conjunction with the accompanying drawings wherein:

BRIEF DESCRIPTION OF THE DRAWINGS

FIG. 4 is a side view of a further embodiment of the invention in which only a single electrically-conductive resilient mooring member is utilized; and FIG. 5 is a sectional view of a portion of FIG. 4 taken along the line 5—5.

DESCRIPTION OF THE PREFERRED EMBODIMENT

Although the invention is generally applicable to any environment in which a floating object is to be tethered, it finds particular utility in connection with a buoy which has been designed and instrumented to serve as an Oceanographic Data Collection System (ODCS). Consequently, the concept will be described hereinafter as forming part of such a system, but it will be understood that such description is illustrative only and is not to be taken as restricting the use of the invention to such apparatus.

One type of ODCS is designed to provide meteorological and oceanographic data to support surface, aircraft, rocket, and missile test operations in a given range area. This ODCS is instrumented to measure wind speed and direction, air temperature, barometric pressure, sea surface temperature and wave height. It is further arranged to measure sub-surface temperature, current speed, and current direction at three different depths. The data thus derived is stored in the buoy and transmitted on command to a shore station, where it is customarily recorded for reduction by computer techniques.

Figure 1:
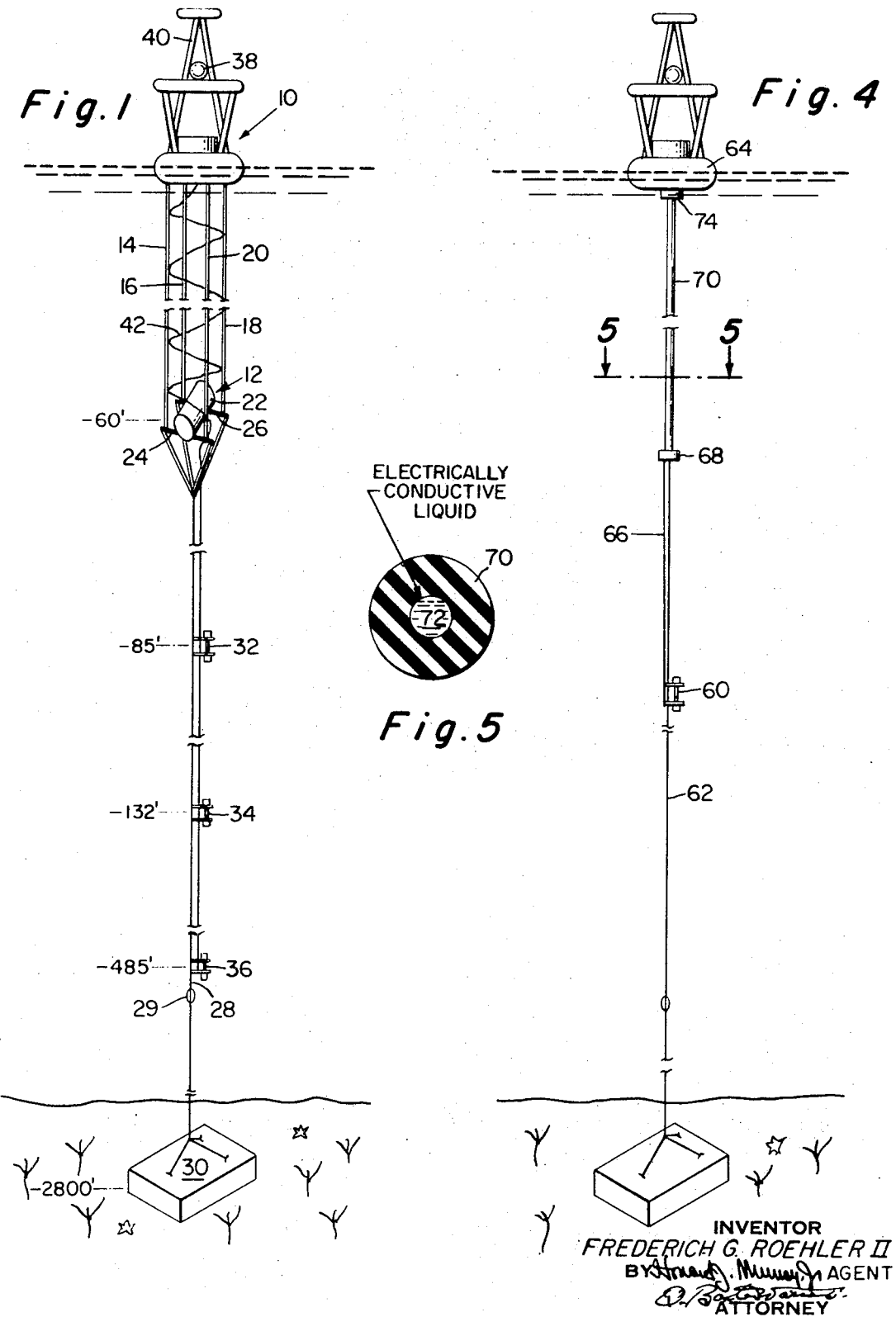
FIG. 1 is a perspective view of one embodiment of the invention as applied to the stabilization of a weather buoy.

An ODCS system designed to incorporate the present concept is shown in FIG. 1 of the drawings. It preferably comprises a surface buoy 10 connected to a subsurface buoy 12 by a plurality of pliant members 14, 16, 18 and 20, these members being composed of material possessing a predetermined degree of elasticity selected in accordance with the maximum expected vertical displacement of surface buoy 10 due to wave action.

In the illustrated embodiment, the sub-surface buoy 12 lies at a depth of 60 feet, and is made up of an air tank 22 resting on a cradle consisting of two spaced-apart parallel arms 24 and 26. Resilient members 14 and 20 are shown attached to opposite ends of arm 24, while resilient members 16 and 18 are attached to opposite ends of arm 26. In cross-section, therefore, the geometrical figure formed by members 14, 16, 18 and 20 is a rectangle with such members lying at the respective corners thereof.

The sub-surface buoy 12 is taut-moored by a steel cable 28 swiveled at 29 to an anchor 30 shown lying at a depth of 2,800 feet. The anchor 30 may be in the form of a concrete block, or, alternatively, it may comprise a power supply such, for example, as a radio-isotropic thermal generator. Carried on the cable 28 are three sensors 32, 34 and 36, each of these sensors measuring water temperature, current speed and current direction, and being located at depths of 85 feet, 132 feet and 485 feet, respectively. As illustrated in the drawing, data transmission cables leading to their respective sensors are secured to the strain-carrying cable 28 at regular intervals, but are themselves strain-relieved. Water-tight connectors (not shown) in these data transmission cables allow for removal of any or all of the sensors 32, 34 and 36 for replacement or repair.

Additional oceanographic sensors (not shown) may be mounted on the sub-surface buoy 22 to measure water temperature as well as wave height. Associated therewith on the sub-surface buoy 22 are two self-contained battery-operated pingers which assist in locating the sub-surface buoy should the surface buoy 10 break free during adverse weather conditions.

Several meteorological sensors 38 are mounted in a group 9 feet above the waterline on a quadrapod mast 40 rising from buoy 10, this group also including radar corner reflectors, the transmit/receive antenna, and the navigation light. The sea surface temperature sensor is in the bottom of buoy 10 at a depth of about 3 feet. All sequencing, memory, transmit and receive electronics and the battery power supplies are contained within the body of buoy 10, the system being designed for approximately 12 months of continuous service before maintenance is necessary.

The ODCS shown in FIG. 1 of the drawings incorporates a major design modification of arrangements heretofore utilized, the result being an increase in reliability and reduced vulnerability to damage. It resides in the manner in which the surface buoy 10 is tied to the sub-surface buoy 12, the conventional single cable being replaced by the four pliant members 14, 16, 18 and 20. As hereinbefore stated, these members may be in the form of cables composed of material possessing a predetermined degree of elasticity. In one system which has proven to be satisfactory under normal operating conditions, the members 14, 16, 18 and 20 are of 1-inch diameter natural rubber pre-loaded to approximately 800 pounds. This effectively maintains the surface buoy 10 directly over the sub-surface buoy 12, thereby protecting the electrical data-transmission cable 42 between the buoys as well as the mooring hardware. In addition, this four-point suspension configuration has the effect of stabilizing the surface buoy 10 against rotation in a horizontal plane, since the sub-surface buoy 12 is essentially unaffected by wind and wave action at its 60-foot depth.

It has been found that a particularly suitable material for use in fabricating the tethering members 14, 16, 18 and 20 is natural rubber. In addition to being highly resistant to hardening or deterioration from contact with sea water, the constant flexing of the cable surface greatly inhibits marine growth, apparently due to the inability of many marine organisms to gain a point of attachment thereto. Furthermore, an important factor contributing to the destruction of conventional mooring components is the work hardening of the material through millions of flexures in the ocean environment. A natural rubber rod when flexed within its design limits has no such work hardening characteristic. The flexures need not occur at the maximum tensile loads in conventional moorings for them to fail from this flexure mode.

Under certain circumstances it may not be necessary to provide the same high degree of stability to a floating object as is the case with the arrangement of FIG. 1 of the drawings. It is then feasible to employ the apparatus of FIGS. 2 and 3, in which a single resilient tethering member 44 in the form of a continuous band which runs over a pair of sheaves 46 and 48 respectively journalled in blocks 50 and 52, the former being secured to a floating object 54 and the latter being connected to an anchor 56 by a rigid (non-elastic) cable 58. If increased control is desired, a second continuous band 59 and its associated sheaves 59a and 59b may be added along with double pulley blocks, as brought out in FIG. 2. As before, the degree of resiliency of the member 44 will be chosen in accordance with the amount of positional displacement of the object 54 which can be tolerated under the circumstances of the case.

One important advantage accruing from the employment of the continuous band 44 is that its area of contact with the sheaves 46 and 48 may be readily changed either by diver manipulation or as a natural result of wave action on the floating object 54. This shifting of the "wear surface" of the band 44 results in a greatly increased life expectancy for the elastic member and minimizes maintenance problems.

Figure 2:
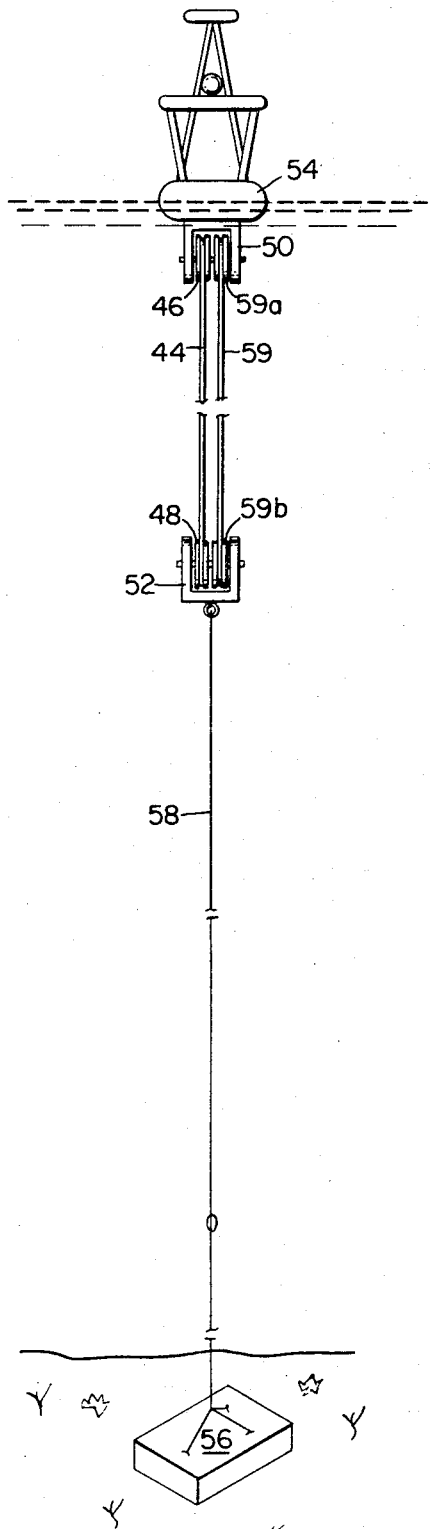
FIG. 2 is an elevational view of a modification of the apparatus of FIG. 1 showing a pair of resilient mooring members mounted on sheaves.
Figure 3:
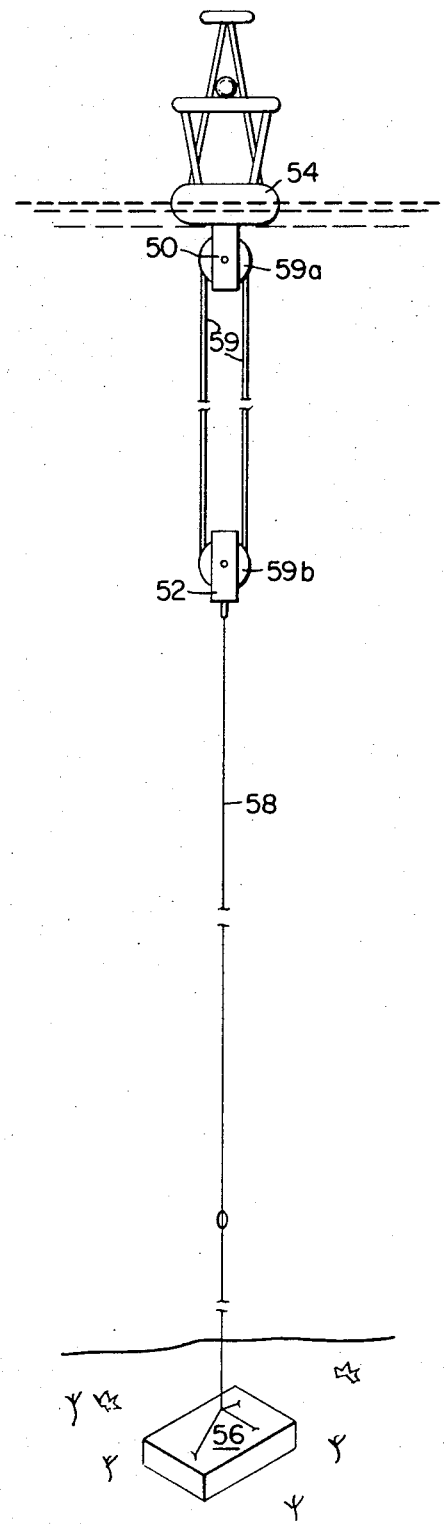
FIG. 3 is a side view of one of the resilient members of FIG. 2 together with a portion of its mounting structure.

It will be recognized that, unlike the arrangement of FIG. 1, the design of FIGS. 2 and 3 does not provide for the transmission of electrical data from a sub-surface point to the floating object. If such a requirement exists, the embodiment of FIGS. 4 and 5 finds application. If data from a sensor 60 (for example) carried on a non-stretchable cable 62 is to be conducted to floating object 64, it can be accomplished by means of a conventional conductor 66 leading to one end 68 of a cable 70 having one or more separate hollow passages therein and composed of flexible material such, for example, as natural rubber, each hollow passage being filled with an electrically-conductive substance 72 in liquid form, such, for example, as mercury. FIG. 5 shows a possible cross section. The conventional connection or contact at the upper end 74 of this liquid column is such as to compensate for any change in height of the column of conductive liquid as the rubber cable 70 stretches or contracts. Alternatively, a separate reservoir of conductive liquid may be utilized at the top of each passage. Such a design eliminates any requirement for a separate data-transmission cable between points 68 and 74 in FIG. 4. The use of a mercury core also provides a telemetry link by using inductively-coupled transducers (not shown) to feed the single core while employing sea water as the return path. In addition, sensor batteries can be trickle-charged between data transmissions through similar inductive coupling.

Purely as examples, one test was successfully conducted of a 3,000-pound ODCS in the form of a toroid moored to a 2,000-pound anchor by four resilient members composed of natural rubber and having one-inch diameters. Another successful test consisted of mooring a 900-pound 14-foot circumference ball to a 200-pound anchor with two one-inch natural rubber cables 20 feet long tensioned to 200 pounds at 40-foot extension. The natural rubber of which the cables were composed was found to greatly inhibit the harmonic strumming which is caused by the shedding of water in a current stream over a long connector of this type. As to the modification of FIGS. 4 and 5, one sample was cycled 500,000 times without loss of mercury or electrical continuity.

It will now be recognized that the preset invention provides a tethering member or members of simple design in which the mooring tension is predeterminable and which will allow for unlimited cycling without appreciable variation in operating characteristics. Furthermore, the low cost and low maintenance of the system is coupled with its corrosion resistance and freedom from fouling due to excessive marine growth. When a plurality of resilient tethering members are utilized, the floating object may be almost completely stabilized, not only from drift but also against angular rotation due to wind and/or wave action.

Obviously many modifications and variations of the present invention are possible in the light of the above teachings. It is therefore to be understood that within the scope of the appended claims the invention may be practiced otherwise than as specifically described.

I claim:

1. A stabilized oceanographic monitoring station comprising:

a surface weather buoy equipped to provide meteorological and oceanographic data;

four elongated resilient rubber members connected to said weather buoy and arranged to define a geometrical figure of rectangular cross-section with the four members lying in the respective corners thereof; said resilient members being comprised of one-inch diameter natural rubber preloaded to approximately 800 pounds;

a sub-surface buoy connected to the lower ends of the four elongated members at a predetermined depth; said sub-surface buoy adapted to support an air tank and oceanographic sensors;

a non-resilient cable connecting said sub-surface buoy to an anchor at a predetermined depth;

at least one oceanographic sensor carried on said non-resilient cable at a predetermined depth and electrically connected by a data transmission cable to transmitting means mounted on said weather buoy whereby water temperature, current speed and current direction may be monitored.

* * * * *